United States Patent [19]

Akhtar

[11] Patent Number: 5,028,124

[45] Date of Patent: Jul. 2, 1991

[54] THIN FILM ELECTROCHROMIC DISPLAYS

[76] Inventor: Masud Akhtar, 8 Wexford Dr., Lawrenceville, N.J. 08648

[21] Appl. No.: 165,170

[22] Filed: Mar. 7, 1988

[51] Int. Cl.⁵ .............................................. G02F 1/01
[52] U.S. Cl. ................................................. 350/357
[58] Field of Search ........................ 350/357; 429/192

[56] References Cited

U.S. PATENT DOCUMENTS

| | | | |
|---|---|---|---|
| 4,116,546 | 9/1978 | Leibowitz | 350/356 |
| 4,231,641 | 11/1980 | Randin | 350/357 |
| 4,448,493 | 4/1984 | Matsudaira | 350/357 |
| 4,550,982 | 11/1985 | Hirai | 350/357 |
| 4,573,768 | 3/1986 | Polak et al. | 350/357 |
| 4,750,817 | 7/1988 | Sammells | 350/357 |
| 4,828,369 | 5/1989 | Hotomi | 300/357 |
| 4,849,311 | 9/1988 | Itoh et al. | 429/192 |
| 4,851,308 | 7/1989 | Akhtar | 429/192 |

OTHER PUBLICATIONS

Worthy, "Polymer Conducts at Room Temperature", *Chemical and Engineering News*, Nov. 1985, pp. 28–29.

*Primary Examiner*—Eugene R. Laroche
*Assistant Examiner*—Michael Shingleton
*Attorney, Agent, or Firm*—George E. Kersey

[57] ABSTRACT

Thin film electrochromic methods and devices which are rigid or flexible and employ moldable solid-state electrolytes formed by combining an organic polymer with an inorganic substance.

20 Claims, 1 Drawing Sheet

THIN FILM ELECTROCHROMIC DISPLAYS

BACKGROUND OF THE INVENTION

This invention relates to electrochromic displays which produce a chemical color change when exposed to an electromagnetic stimulus, and, more particularly to large area, thin film electrochromic displays.

In a typical electrochromic display, a variable and reversible potential or current is applied across outer electrodes to produce reversible color changes in the electrochromic material. In thin film displays, a thin film electrochromic material is positioned against a thin film electrolyte and both films are sandwiched between two electrodes.

Such devices can be used in indoor or outdoor displays, electronic data displays, advertising and clocks. A potential use is in adjusting the amount of solor energy passing through windows, thus reducing the heating, cooling and lighting expenses of buildings.

Since electrochromic devices should exhibit ionic as well as electronic conduction with associated reversible and visible optical absorption, they generally use liquid electrolytes. Such electrolytes are highly acidic or corrosive salt solutions enclosed in leaktight and inert containers. Chemical degradation and electrode deterioration reduce their useful life times. These devices have failed to reach commercialization largely because of chemical and physical problems associated with liquid electrolyes.

As a result, an attempt has been made to employ a solid-state electrolyte. One such device is based on metal oxides. This U.S. Pat. No. 3,521,941, where magnesium fluoride ($MgFl_2$) is used to supply protons and several insulator layers are used to stop electron flow. Unfortunately, these devices are irreproducible and suffer from imperfect reversibility.

Commercially viable devices have yet to be produced because of the uncontrolability of the chemical species that have been used to date.

Accordingly, it is an object of the invention to facilitate the production of electrochromic materials. A related object is to overcome the shortcomings of the prior art. Another object is to do so for large-area panels. A further related object is to provide improved color contrast and wide viewing angles.

Still another object of the invention is to increase the cycle life of electrochromic devices and decrease the response time at relatively low cost.

A further object of the invention is to achieve low power consumption for devices with fast recovery from overload and short circuit conditions.

Yet another object of the invention is to achieve photochromic devices that are easily patterned.

Still another object of the invention is to achieve relative freedom from maintenance, with improved reliability at variable operating temperatures and simplified fabrication. A related object is to realize electrochromic devices with flexible substrates that can assume any prescribed size or shape without extra encapsulation cost.

SUMMARY OF THE INVENTION

In accomplishing the foregoing and related objects, the invention provides an electrochromic display that permits electrochemical color changes by combining an electrochromic material, which is in contact with a first electrode, and a solid-state electrolyte, which is in contact with a second electrode.

The electrochromic material is a metallic oxide or combination of oxides of group IV, V, VI and VIII metals. In particular, the electrochromic material can be selected from the class consisting of metal oxyhalides, sulphides, tungstates, molybdates, stannates, vanadates, chromates, titanates, selinides and tellurides.

In accordance with one aspect of the invention, one of the electrodes includes a second electrochromic material in contact with the electrolyte.

The electrolyte is constituted by an organic polymer combined with an inorganic substance. The inorganic substance of the electrolyte is a protonic acid or a metallic salt. The electrolyte has an acidic hydrogen ion concentration (pH) in the range above 0 and below 7, preferably in the range from about 4 to 5. The organic polymer has a molecular weight ranging between 400 and 10,000 and is selected from the class consisting of polymeric imines, oxides, sulphides, halides and alkyls.

The electrolyte can include an inert powder selected from the class consisting of microporous "TEFLON" teflon, alumina and silica.

In accordance with a further aspect of the invention the display has at least one electrode which is transparent or opaque and rigid or flexible. At least one of the electrodes desirably is a composite of materials to produce color enhancement.

In a method of preparing an electrolyte for an electrochromic display, an organic polymer is combined with an inorganic material in a aqueous or nonaqueous solvent and the solvent is evaporated from the combination of the organic polymer and inorganic material.

The electrolyte desirably is dispersed over a porous, flexible and inert support. The organic polymer of the electrolyte can be combined with one or more protonic acids, an inorganic salt or complex containing a metallic ion. The electrolyte can be formed by molding a transparent solid gel having a glassy structure and a moisture content adjusted in the range from about 0 to about 40% while preserving the glassy structure of the gel.

In a method of operating a photochromic device in accordance with the invention, a solid-state electrolyte is operated in a temperature range from about $-10°$ to about $100°$ C. The operation desirably is at an ambient temperature of about $20°$ C. The photochromic device is subjected to an electromagnetic stimulus, including light, to produce a color change ranging from transparency to any desired color.

The electrolyte desirably is prepared by combining a protonic acid or a metallic salt with an organic polymer including poly(ethyleneimines), poly(ethylenesulfides), poly(ethyleneoxides) and the like.

The protonic acid can be selected from the class of acids including hydrochloric acid, phosphoric acid, sulfuric acid, toluene sulfonic acid, acetic acid, trifluoromethane sulfonic acid, polystyrene sulfonic acid or from a mixture of various acids.

The metallic salt can be selected from the class of alkali metals including lithium salts of the type lithium perchlorate, lithium hexafluoroarsenate, lithium trifluoromethanesulfonate and lithium iodide on chloride, etc.

The electrolyte also can be mixed with inert supports such as microporous teflon, alumina or silica powders or pigments and can be positioned over a porous support.

When the electrolyte contains an alkali metal salt, a counter-electrode is included which is an alkali metal ion acceptor and releaser.

The electrochromic material preferably is selected from a wide variety of metal oxides including group V metal oxides such as niobium and vanadium oxides, group VI metal oxides such as tungsten and molybdenum oxides, group VIII metal oxides such as nickel, cobalt, irridium and rhodium oxides.

In one method of preparing a thin film electrochromic device, films of metal oxide can be deposited on a substrate of choice by radio frequency (RF) sputtering, thermal evaporation and colloidal solution spin coating of source oxides. Other methods include deposition by sol-gel techniques or pyrolysis of metal alkoxides. Thin films of electrolytes can be deposited using thin/thick film coating technology and can be dried at a desired temperature, illustrating about 100° C., or the solvent can be removed from the films by evacuation.

DESCRIPTION OF THE DRAWINGS

Other aspects of the invention will become apparent after considering several illustrative embodiments taken in conjunction with the drawings in which.

DETAILED DESCRIPTION

Figure 1A:
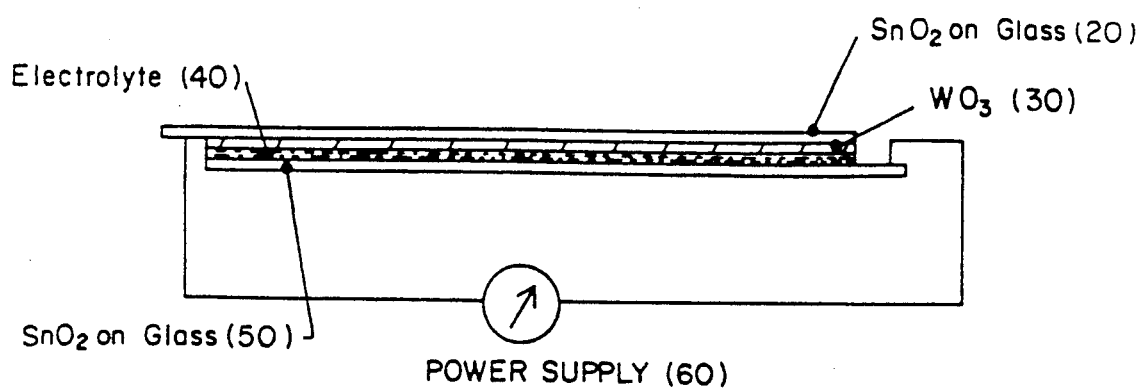
FIG. 1A is a cross-sectional view of a solid-state thin film device in accordance with the invention.

With reference to the drawings, FIG. 1A shows a thin film electrochromic device 10 formed between two conductive tin oxide coated glass electrodes 20 and 50. A thin film 30 of tungsten oxide (WO3) and a thin film of electrolyte 40 are placed between the electrodes 20 and 50. The thin film 30 of tungsten oxide has a thickness of approximately 3000 Angstrom units (AÅ), while the thin film 40 of electrolyte has a thickness of approximately 10,000 Å. The electrodes 20 and 50 are connected to a reversible polarity power supply 60 to supply potential or current.

The following nonlimiting examples are used to illustrate the manufacture and use of the device 10 of FIG. 1A:

EXAMPLE I

A device was constructed as shown in FIG. 1A with tungsten oxide (WO3) deposited over a conductive glass electrode 20 by thermal evaporation. Electrolyte was prepared by adding concentrated sulphuric acid) (H2SO4) to poly(ethyleneimine) (PEI), a cross-linked material having a molecular weight between 50,000 and 60,000, 50% in water. The pH of the mixture was adjusted between 4-5 without precipitation. This thick viscous liquid was coated over the second conducting glass electrode 50 and heated at about 50° C. for one hour and then placed against the WO3 carried by the first electrode 20. The device was further dried by heating at about 80°-100° C. for eight hours. The electrolyte hardened into a clear transparent film.

Figure 1B:
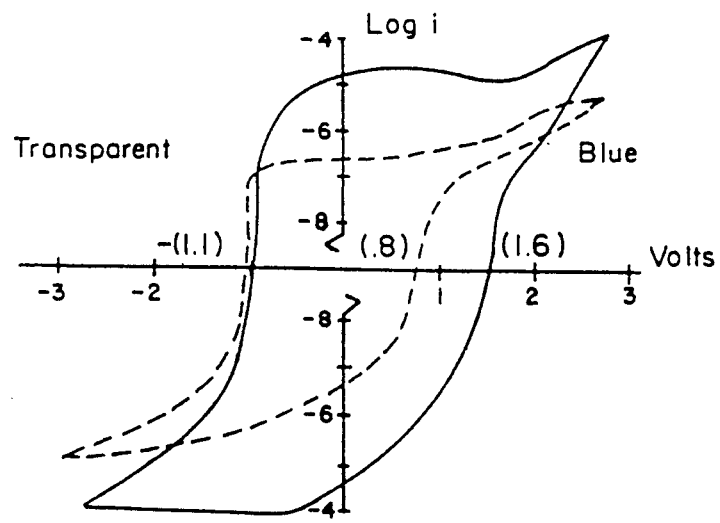
FIG. 1B is a cyclic voltammogram of voltage against the logarithm of current for a sulfuric acid/poly(ethyleneimine) electrolyte.

The initial voltammogram is shown in FIG. 1B in solid line form. The device was then tested by being cycled between −3 volts and +3 volts 64,000 times, with the results shown in the dashed line plot of FIG. 1B. The cyclic voltammograms of the solid state device in FIG. 1B is for before and after cycling at 20° C. No device degradation was observed. The slight shift between the solid line voltammogram at the beginning of the test and the dashed-line voltammogram after 64,000 cycles is probably due to the sample history (a memory effect). The color change between transparent and blue was observed during less than one second and is probably due to the reaction set forth in equation (1), below:

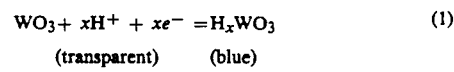

$$WO_3 + xH^+ + xe^- = H_xWO_3 \quad (1)$$

(transparent) (blue)

Where "x" represents the number of hydrogen ions $H^+$ and electrons $e^-$ involved in the reaction.

The transparent and colored states are quite stable and in the absence of applied potential the colors did not interconvert for several hours.

EXAMPLE II

Figure 1C:
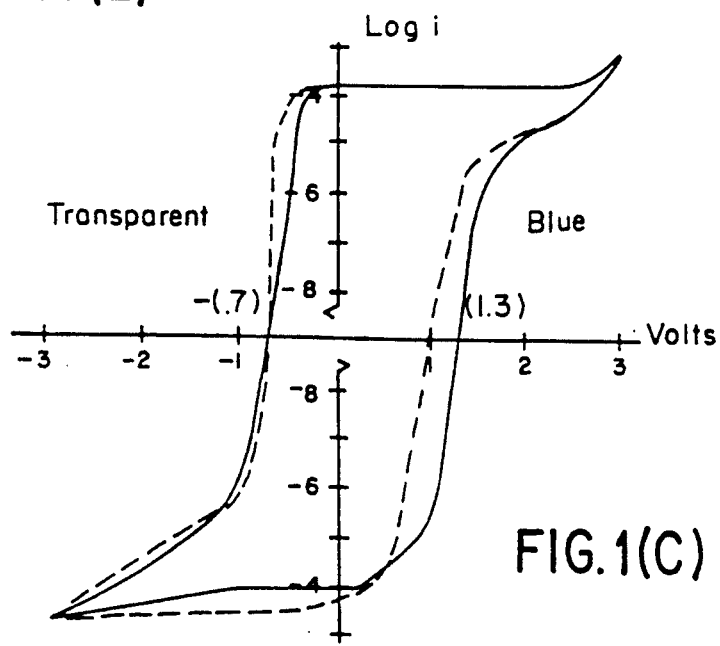
FIG. 1C is a cyclic voltammogram for a phosphoric acid/poly(ethyleneimine) electrolyte.

A device 10 was constructed as shown in FIG. 1A and described in Example I using an electrolyte 40 prepared from concentrated phosphoric acid in acetonitrile (CH3CN) and poly(ethyleneimine) of molecular weight about 10,000. The device switched between transparent and blue, without any visible degradation during cycles as shown in FIG. 1C.

EXAMPLE III

An electrochromic device 10 was prepared using the procedure described in Example I using an electrolyte 40 prepared from poly(ethyleneimine), having a molecular weight between 50,000 and 60,000, and lithium trifluoromethanesulfonate (CF3SO3Li). The device switched between transparent (−1.9 V) and blue (1.2 V), but had to be cycled between −5 V for good color distinction.

EXAMPLE IV

A device 10 was constructed using the method described in Example I but the electrolyte 40 was prepared by precipitating an acid and imine complex by adding concentrated sulphuric acid (H2SO4) to an equal weight mixture in water of poly(ethyleneimine) having a molecular weight of about 10,000 and hydroxyethylated poly(ethyleneimine) of molecular weight about 40,000. The amine mixture had two weight percent microporous teflon powder (40/60 mesh) mixed with it. The device switched between white and blue when cycled between ∓3 V.

EXAMPLE V

A transparent conductive electrode 20 was prepared by radio-frequency (RF) sputtering of fluoride-doped tin oxide over a clear teflon sheet. A thin film 30 of tungsten oxide (WO3) was deposited over the electrode 20 by thermal evaporation. The film 30 was coated with a thickened electrolyte 40 prepared from concentrated phosphoric acid (H3PO4) and poly(ethyleneimine) of molecular weight from 50,000 to 60,000 in acetonitrile and dried at 50°-60° C. for 24 hours. A patterned thin film 50 of gold was deposited over the solid-glassy electrolyte 40. This flexible patterned device changed from gold to blue when a potential of ±3 V was applied between tin oxide electrode 20 and gold electrode 50 having the desired pattern.

What is claimed is:

1. An electrochromic display for providing an electrochemical color change, comprising:
   a metallic oxide electrochemical material selected from oxides of Group IV, V, VI and VIII metals;
   a first electrode in contact with said electrochromic material;
   a solid-state anhydrous electrolyte constituted by an organic polymer combined with an inorganic substance, in contact with said electrochromic material; and
   a second electrode in contact with said electrolyte.

2. A display as defined in claim 1 wherein said electrochromic material is selected from the class consisting of metal oxyhalides, sulfides, tungstates, molybdates, stannates, vanadates, chromoates, titanates, celinides and tellurides.

3. A display as defined in claim 1 wherein use of the electrodes includes a second electrochromic material in contact with said electrolyte.

4. A display as defined in claim 1 wherein said organic polymer has a molecular weight ranging between 400 and 10,000 and is selected from the class consisting of polymeric imines, oxides, sulphides, halides and alkyls.

5. A display as defined in claim 4, wherein said protonic acid, contains no complex water molecules.

6. A display as defined in claim 4, wherein said protonic acid, is sulfuric.

7. A display as defined in claim 4, wherein said protonic acid, is phosphoric.

8. A display as defined in claim 1 wherein at least one of the electrodes is transparent or opaque and rigid or flexible.

9. A display as defined in claim 1 wherein said electrolyte includes an inert powder selected from the class consisting of silica.

10. A display as defined in claim 1 wherein said inorganic substance is a protonic sulfonic acid.

11. A display as defined in claim 10 wherein said inorganic substance is arylsulfonic acid.

12. A display as defined in claim 11 wherein said inorganic substance is selected from the class consisting of toluene and polystyrene sulfonic acids.

13. A display as defined in claim 1 wherein said inorganic substance is fluorosulfonic.

14. A display as defined in claim 13 wherein said inorganic substance is trifluromethane sulfonic acid.

15. A display as defined in claim 1 wherein said inorganic substance is acetic acid.

16. A display as defined in claim 1 wherein said inorganic substance is a metallic salt selected from the class of alkali metals.

17. A display as defined in claim 1 wherein said inorganic substance is a metallic salt selected from the class of lithium salts, including lithium halide metallic salts.

18. An electrochromic device comprising in combination an electronic conductor, an electrochromic material in contact with said conductor, a solid anhydrous electrolyte formed as a solution phase blend in a mutually miscible solvent of an organic polymer and a protonic acid or salt thereof disposed on said electrochromic material and a counter-electrode in contact with said solid electrolyte.

19. A display as defined in claim 18, wherein said solid electrolyte comprises a blend of
   (1) a protonic acid or salt thereof having the generic formula:

$A(XO_i)$, where X is selected from the group consisting of protonic acid metals, A is selected from the group consisting of hydrogen and hydrogen containing compounds, O is an oxidizer and "i" is an integer governed by the valence associated with X, and
   (2) a polymer selected from the group consisting of imines, oxides, sulfides, halides, and alkyls.

20. A display as defined in claim 1 wherein said inorganic substance is a metallic salt selected from the class of lithium perchlorates, lithium hexafluoarsenates and lithium trifluoromethanesulfonates.

* * * * *